(12) United States Patent
Ayzenberg et al.

(10) Patent No.: US 10,235,091 B1
(45) Date of Patent: Mar. 19, 2019

(54) FULL SWEEP DISK SYNCHRONIZATION IN A STORAGE SYSTEM

(71) Applicant: EMC IP Holding Company, LLC, Hopkinton, MA (US)

(72) Inventors: Lev Ayzenberg, Petah Tikva (IL); Assaf Natanzon, Tel Aviv (IL); Valerie Lotosh, Ramat Gan (IL); Alex Solan, Hertzliya (IL); Tomer Twig, Petach Tikva (IL); Erez Sharvit, Givat Ella (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 125 days.

(21) Appl. No.: 15/274,381

(22) Filed: Sep. 23, 2016

(51) Int. Cl.
*G06F 3/06* (2006.01)

(52) U.S. Cl.
CPC ............ *G06F 3/065* (2013.01); *G06F 3/0619* (2013.01); *G06F 3/0644* (2013.01); *G06F 3/0683* (2013.01)

(58) Field of Classification Search
CPC ............................... G06F 3/065; G06F 3/0683
See application file for complete search history.

(56) References Cited

U.S. PATENT DOCUMENTS

| | | | |
|---|---|---|---|
| 5,170,480 A | 12/1992 | Mohan et al. | |
| 5,249,053 A | 9/1993 | Jain | |
| 5,388,254 A | 2/1995 | Betz et al. | |
| 5,499,367 A | 3/1996 | Bamford et al. | |
| 5,526,397 A | 6/1996 | Lohman | |
| 5,864,837 A | 1/1999 | Maimone | |
| 5,879,459 A | 3/1999 | Gadgil et al. | |
| 5,990,899 A | 11/1999 | Whitten | |
| 6,042,652 A | 3/2000 | Hyun et al. | |
| 6,065,018 A | 5/2000 | Beier et al. | |
| 6,143,659 A | 11/2000 | Leem | |
| 6,148,340 A | 11/2000 | Bittinger et al. | |
| 6,174,377 B1 | 1/2001 | Doering et al. | |

(Continued)

FOREIGN PATENT DOCUMENTS

| | | |
|---|---|---|
| EP | 1154356 | 11/2001 |
| WO | WO 00 45581 A3 | 8/2000 |

OTHER PUBLICATIONS

U.S. Appl. No. 15/274,362, filed Sep. 23, 2016, Baruch et al.
(Continued)

*Primary Examiner* — Tuan V Thai
*Assistant Examiner* — Alexander J Yoon
(74) *Attorney, Agent, or Firm* — Daly, Crowley, Mofford & Durkee, LLP

(57) ABSTRACT

Described embodiments provide systems and methods for synchronizing a production volume and a backup volume of a storage system. A first thin volume is created and associated with the production volume. A first replica of the production volume is generated by copying data from the production volume to a replica volume. During the copying, an I/O request to be written to the production volume may be received. Data from the I/O request is written to the first thin volume and data changed due to the I/O request is tracked in metadata associated with the production volume and the first thin volume. A size of the first thin volume is checked, and when the size of the first thin volume is below a threshold, changes from the first thin volume are applied asynchronously to the backup storage.

16 Claims, 7 Drawing Sheets

(56) References Cited

U.S. PATENT DOCUMENTS

| | | |
|---|---|---|
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,809 B2 | 9/2013 | Notanaon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 * | 4/2014 | Natanzon ............ G06F 11/1471 707/634 |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natnon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Notanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 * | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |

(56) References Cited

U.S. PATENT DOCUMENTS

| | | | |
|---|---|---|---|
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 2002/0129168 A1 | 9/2002 | Kanai et al. |
| 2003/0048842 A1 | 3/2003 | Fourquin et al. |
| 2003/0061637 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2003/0217119 A1* | 11/2003 | Raman ............... H04L 67/1095 709/219 |
| 2004/0024975 A1* | 2/2004 | Morishita ............ G06F 3/0605 711/147 |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 | 8/2005 | Lam et al. |
| 2005/0198083 A1* | 9/2005 | Saika ................... G06F 3/0608 |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2013/0110966 A1* | 5/2013 | Nagami ............... H04L 47/125 709/214 |

OTHER PUBLICATIONS

U.S. Appl. No. 15/274,117, filed Sep. 23, 2016, Baruch.
U.S. Appl. No. 15/274,122, filed Sep. 23, 2016, Baruch et al.
U.S. Appl. No. 15/274,373, filed Sep. 23, 2016, Baruch et al.
U.S. Appl. No. 15/274,129, filed Sep. 23, 2016, Baruch et al.
U.S. Appl. No. 15/275,677, filed Sep. 23, 2016, Baruch et al.
Gibson, "Five Point Plan Lies at the Heart of Compression Technoiogy;" Tech Talk; Apr. 29, 1991; 1 Page.
Soules et al., "Metadata Efficiency in Versioning File Systems;" 2$^{nd}$ USENIX Conference on File and Storage Technologies; Mar. 31, 2003-Apr. 2, 2003; 16 Pages.
AIX System Management Concepts: Operating Systems and Devices; Bull Electronics Angers; May 2000; 280 Pages.
Soules et al., "Metadata Efficiency in a Comprehensive Versioning File System;" May 2002; CMU-CS-02-145; School of Computer Science, Carnegie Mellon University; 33 Pages.
"Linux Filesystems," Sams Publishing; 2002; Chapter 1: Introduction to Filesystems pp. 17-22 and Chapter 3: Overview of Journaling Filesystems pp. 67-71; 12 Pages.
Bunyan et al., "Multiplexing in a BrightStor® ARCserve® Backup Release 11;" Mar. 2004; 4 Pages.
Marks, "Network Computing, 33;" Cover Story; Feb. 2, 2006; 8 Pages.
Hill, "Network Computing, NA;" Cover Story; Jun. 8, 2006; 9 Pages.
Microsoft Computer Dictionary, Fifth Edition; 2002; 3 Pages.
Wikipedia; Retrieved on Mar. 29, 2011 from http://en.wikipedia.org/wiki/DEFLATE: Deflate; 6 Pages.
Wikipedia; Retrieved on Mar. 29, 2011 from http://en.wikipedia.org/wiki/Huffman_coding: Huffman Coding; 11 Pages.
Wikipedia; Retrieved on Mar. 29, 2011 from http:///en.wikipedia.org/wiki/LZ77: LZ77 and LZ78; 2 Pages.

* cited by examiner

FULL SWEEP DISK SYNCHRONIZATION IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. The backup storage system may be situated in the same physical location as the production storage system, or in a physically remote location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An embodiment may provide a method for synchronizing a production volume and a backup volume of a storage system. A first thin volume is created and associated with the production volume. A first replica of the production volume is generated by copying data from the production volume to a replica volume. During the copying, an I/O request to be written to the production volume may be received. Data from the I/O request is written to the first thin volume and data changed due to the I/O request is tracked in metadata associated with the production volume and the first thin volume. A size of the first thin volume is checked, and when the size of the first thin volume is below a threshold, changes from the first thin volume are applied asynchronously to the backup storage.

Another embodiment may provide a system including a processor and a memory storing computer program code that when executed on the processor causes the processor to operate a storage system. The system may be operable to create a first thin volume associated with the production volume. A first replica of the production volume is generated by copying data from the production volume to a replica volume. During the copying, an I/O request to be written to the production volume may be received. Data from the I/O request is written to the first thin volume and data changed due to the I/O request is tracked in metadata associated with the production volume and the first thin volume. A size of the first thin volume is checked, and when the size of the first thin volume is below a threshold, changes from the first thin volume are applied asynchronously to the backup storage.

Another embodiment may provide a computer program product including a non-transitory computer readable storage medium having computer program code encoded thereon that when executed on a processor of a computer causes the computer to operate a storage system. The computer program product may include computer program code to create a first thin volume associated with the production volume. A first replica of the production volume is generated by copying data from the production volume to a replica volume. During the copying, an I/O request to be written to the production volume may be received. Data from the I/O request is written to the first thin volume and data changed due to the I/O request is tracked in metadata associated with the production volume and the first thin volume. A size of the first thin volume is checked, and when the size of the first thin volume is below a threshold, changes from the first thin volume are applied asynchronously to the backup storage.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or data write request. In some embodiments, the term "storage system" may encompass physical computing systems, cloud or virtual computing systems, or a combination thereof. In some embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices.

Figure 1:
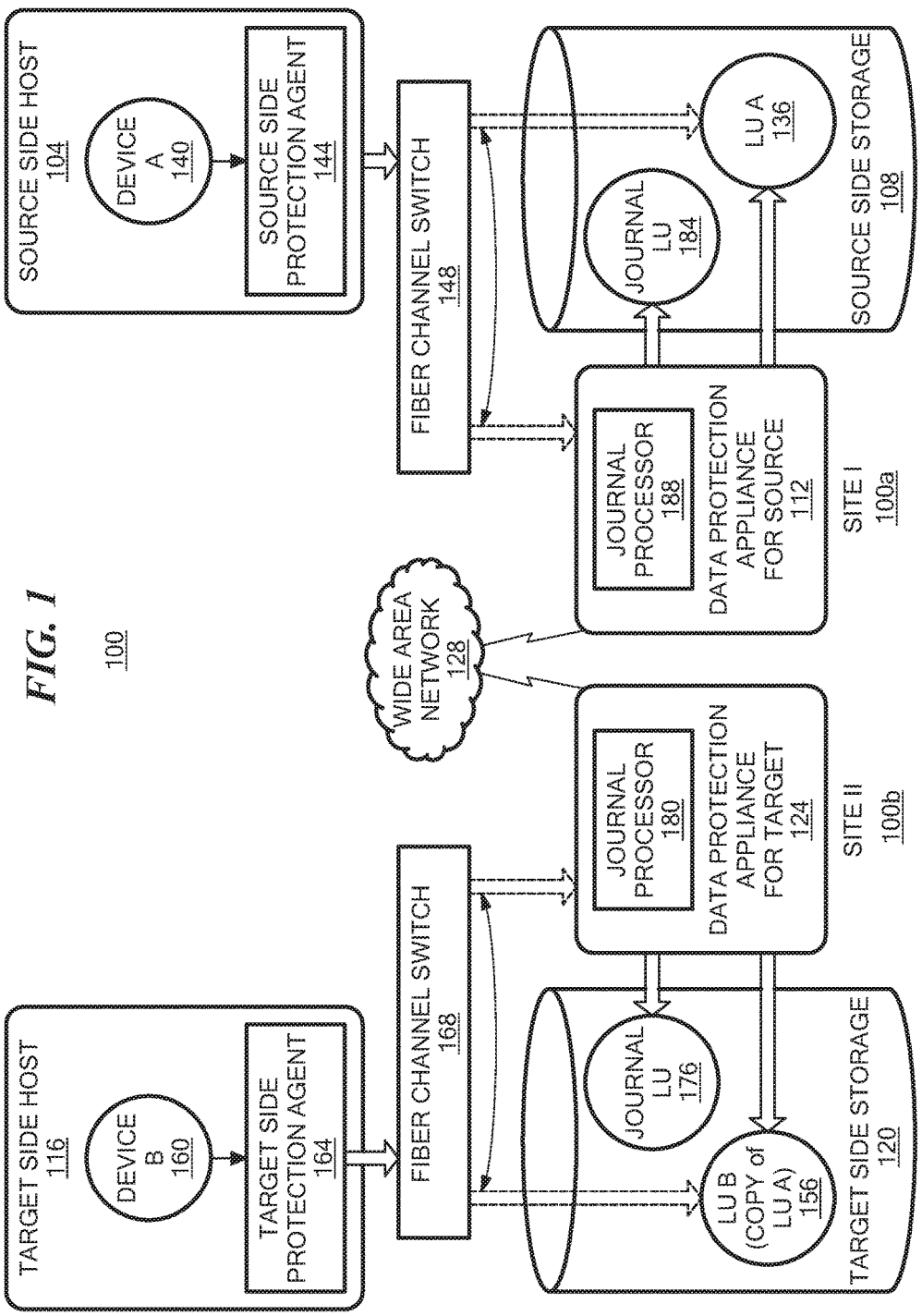
FIG. 1 is a block diagram of a data protection system, according to an illustrative embodiment of the instant disclosure.

Referring to the example embodiment shown in FIG. 1, a data protection system 100 may include two sites, Site I 100a and Site II 100b, which communicate via a wide area network (WAN) 128, such as the Internet. In some embodiments, under normal operation, Site I 100a may correspond to a source site (i.e., the transmitter within a data replication workflow) of system 100 and Site II 100b may be a target site (i.e., the receiver within a data replication workflow) of data protection system 100. Thus, in some embodiments, during normal operations, the direction of replicated data flow may be from Site I 100a to Site II 100b.

In certain embodiments, Site I 100a and Site II 100b may be remote from one another. In other embodiments, Site I 100a and Site II 100b may be local to one another and may be connected via a local area network (LAN). In some embodiments, local data protection may have the advantage of minimizing data lag between target and source, and remote data protection may have the advantage of being robust in the event that a disaster occurs at the source site.

In particular embodiments, data protection system 100 may include a failover mode of operation, wherein the direction of replicated data flow is reversed. In particular, in some embodiments, Site I 100a may behave as a target site and Site II 100b may behave as a source site. In some embodiments, failover may be triggered manually (e.g., by a user) or automatically. In many embodiments, failover may be performed in the event of a disaster at Site I 100a. In some embodiments, both Site I 100a and Site II 100b may behave as source site for some stored data and may behave simultaneously as a target site for other stored data. In certain embodiments, a portion of stored data may be replicated from one site to the other, and another portion may not be replicated.

In some embodiments, Site I 100a corresponds to a production site (e.g., a facility where one or more hosts run data processing applications that write data to a storage system and read data from the storage system) and Site II 100b corresponds to a backup or replica site (e.g., a facility where replicated production site data is stored). Thus, in some embodiments, Site II 100b may be responsible for replicating production site data and may enable rollback of data of Site I 100a to an earlier point in time. In some embodiments, rollback may be used in the event of data corruption of a disaster, or alternatively in order to view or to access data from an earlier point in time.

Described embodiments of Site I 100a may include a source host 104, a source storage system (or "storage array") 108, and a source data protection appliance (DPA) 112 coupled via a first storage area network (SAN). Similarly, in some embodiments, Site II 100b may include a target host 116, a target storage system 120, and a target DPA 124 coupled via a second SAN. In some embodiments, each SAN may include one or more devices (or "nodes") that may be designated an "initiator," a "target", or both. For example, in some embodiments, the first SAN may include a first fiber channel switch 148 and the second SAN may include a second fiber channel switch 168. In some embodiments, communication links between each host 104 and 116 and its corresponding storage system 108 and 120 may be any appropriate medium suitable for data transfer, such as fiber communication channel links. In many embodiments, a host communicates with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

In some embodiments, each storage system 108 and 120 may include storage devices for storing data, such as disks or arrays of disks. Typically, in such embodiments, storage systems 108 and 120 may be target nodes. In some embodiments, in order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. In some embodiments, an LU is a logical entity provided by a storage system for accessing data stored therein. In some embodiments, a logical unit may be a physical logical unit or a virtual logical unit. In some embodiments, a logical unit may be identified by a unique logical unit number (LUN).

In the embodiment shown in FIG. 1, storage system 108 may expose logical unit 136, designated as LU A, and storage system 120 exposes logical unit 156, designated as LU B. LU B 156 may be used for replicating LU A 136. In such embodiments, LU B 156 may be generated as a copy of LU A 136. In one embodiment, LU B 156 may be configured so that its size is identical to the size of LU A 136.

As shown in FIG. 1, in some embodiments, source host 104 may generate a host device 140 ("Device A") corresponding to LU A 136 and source host 116 may generate a host device 160 ("Device B") corresponding to LU B 156. In some embodiments, a host device may be a logical entity within a host through which the host may access an LU. In some embodiments, an operating system of a host may generate a host device for each LU exposed by the storage system in the host SAN.

In some embodiments, source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

In some embodiments, source DPA 112 and target DPA 124 may perform various data protection services, such as data replication of a storage system, and journaling of I/O requests issued by hosts 104 and/or 116. In some embodiments, when acting as a target DPA, a DPA may also enable rollback of data to an earlier point-in-time (PIT), and enable processing of rolled back data at the target site. In some embodiments, each DPA 112 and 124 may be a physical device, a virtual device, or may be a combination of a virtual and physical device.

In some embodiments, a DPA may be a cluster of such computers. In some embodiments, use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (IB) link, a Fibre Channel (FC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. In some embodiments, the DPA cluster leader may coordinate between the computers in the cluster, and may also perform other tasks that require coordination between the computers, such as load balancing.

In certain embodiments, a DPA may be a standalone device integrated within a SAN. Alternatively, in some embodiments, a DPA may be integrated into storage system. In some embodiments, the DPAs communicate with their respective hosts through communication links suitable for data transfer, for example, an InfiniBand (IB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, in some embodiments, the DPAs may issue I/O requests using, for example, SCSI commands, to access LUs on their respective storage systems. In some embodiments, each DPA may also be configured with the necessary functionality to act as targets, e.g., to reply to I/O requests, such as SCSI commands, issued by other initiators in the SAN, including their respective hosts. In some embodiments, being target nodes, the DPAs may dynamically expose or remove one or more LUs. As described herein, in some embodiments, Site I 100a and Site II 100b may each behave simultaneously as a production site and a backup site for different logical units. As such, in some embodiments, DPA 112 and DPA 124 may each behave as a source DPA for some LUs and as a target DPA for other LUs, at the same time.

In the example embodiment shown in FIG. 1, hosts 104 and 116 include protection agents 144 and 164, respectively. In some embodiments, protection agents 144 and 164 may be intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands, differently, according to the type of the command. For example, in some embodiments, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. For example, in some embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. Similarly, in some embodiments, when a DPA behaves as a target device for a certain LU, then during normal course of operation, the associated protection agent fails I/O requests issued by host to the host device corresponding to that LU.

In some embodiments, communication between protection agents 144 and 164 and a respective DPA 112 and 124 may use any protocol suitable for data transfer within a SAN, such as fiber channel, SCSI over fiber channel, or other protocols. In some embodiments, the communication may be direct, or via a logical unit exposed by the DPA.

In certain embodiments, protection agents may be drivers located in their respective hosts. Alternatively, in some embodiments, a protection agent may also be located in a fiber channel switch, or in any other device situated in a data path between a host and a storage system or on the storage system itself. In some embodiments, in a virtualized environment, the protection agent may run at the hypervisor layer or in a virtual machine providing a virtualization layer.

Figure 2:
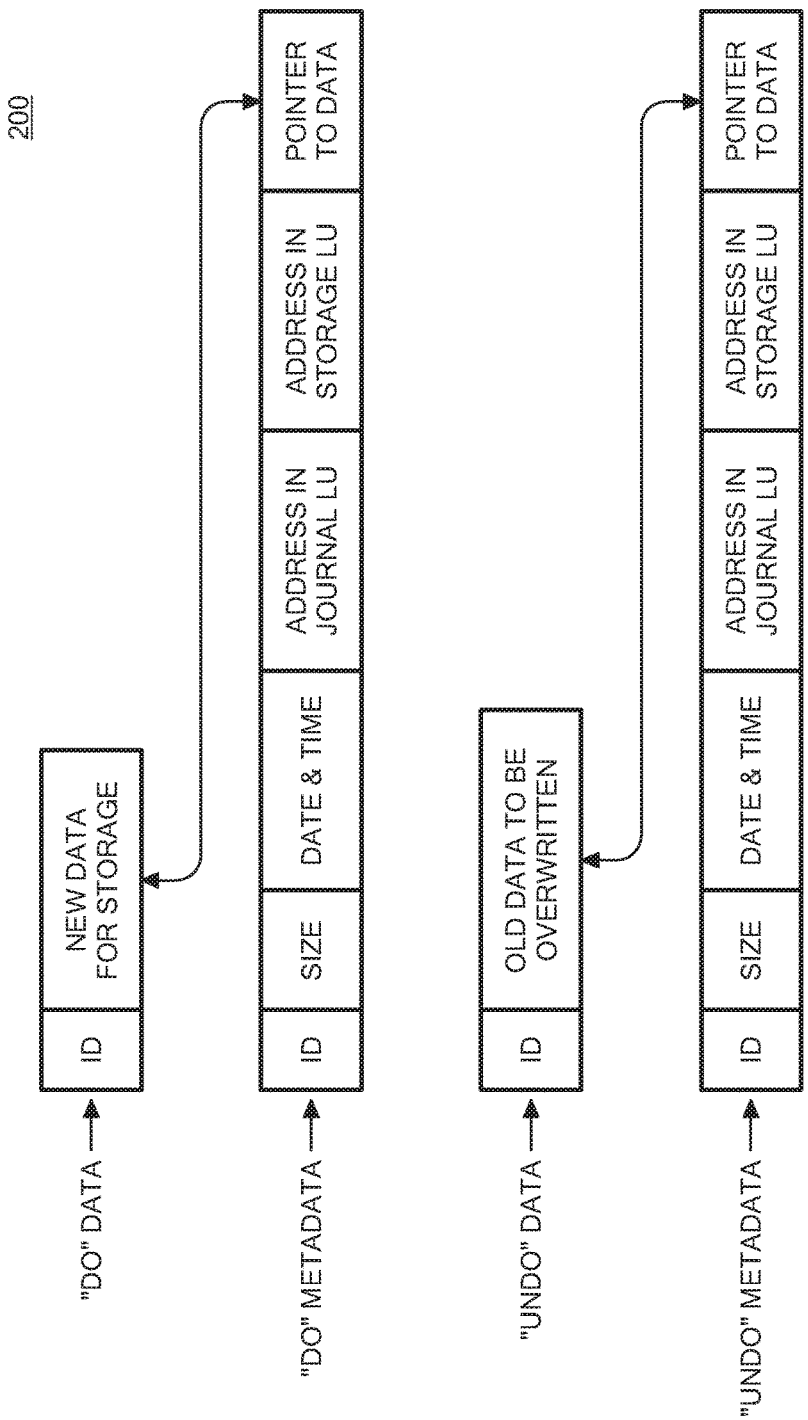
FIG. 2 is a diagram illustrating a journal history of write transactions for the data protection system of FIG. 1, according to an illustrative embodiment of the instant disclosure.

As shown in the example embodiment shown in FIG. 1, target storage system 120 may expose a journal LU 176 for maintaining a history of write transactions made to LU B 156, referred to herein as a "journal." In some embodiments, a journal may be used to provide access to storage at specified points-in-time (PITs), as discussed in greater detail in regard to FIG. 2. In some embodiments, the journal may be stored across multiple LUs (e.g., using striping, etc.). In some embodiments, target DPA 124 may include a journal processor 180 for managing the journal within journal LU 176. Referring back to the example embodiment of FIG. 1, journal processor 180 may manage the journal entries of LU B 156. Specifically, in some embodiments, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal. In one embodiment, journal processor 180 may perform processing such as described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Some embodiments of data protection system 100 may be provided as physical systems for the replication of physical LUs, or as virtual systems for the replication of virtual LUs. For example, in one embodiment, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In some embodiments, in normal operation (sometimes referred to as "production mode"), DPA 112 may act as a source DPA for LU A 136. Thus, in some embodiments, protection agent 144 may act as a source protection agent, specifically by splitting I/O requests to host device 140 ("Device A"). In some embodiments, protection agent 144 may send an I/O request to source DPA 112 and, after receiving an acknowledgement from source DPA 112, may send the I/O request to LU A 136. In some embodiments, after receiving an acknowledgement from storage system 108, host 104 may acknowledge that the I/O request has successfully completed.

In some embodiments, when source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. In some embodiments, when applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In some embodiments, in synchronous mode, source DPA 112 may send each write transaction to target DPA 124, may receive back an acknowledgement from the target DPA 124, and in turn may send an acknowledgment back to protection agent 144. In some embodiments, in synchronous mode, protection agent 144 may wait until receipt of such acknowledgement before sending the I/O request to LU 136. In some embodiments, in asynchronous mode, source DPA 112 may send an acknowledgement to protection agent 144 upon receipt of each I/O request, before receiving an acknowledgement back from target DPA 124.

In some embodiments, in snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. In some embodiments, in snapshot mode, source DPA 112 may send an acknowledgement to protection agent 144 upon receipt of each I/O request, before receiving an acknowledgement back from target DPA 124.

In some embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

As described herein, in some embodiments, in normal operation, LU B 156 may be used as a backup of LU A 136. As such, in some embodiments, while data written to LU A 136 by host 104 is replicated from LU A 136 to LU B 156, target host 116 should not send I/O requests to LU B 156. In some embodiments, to prevent such I/O requests from being sent, protection agent 164 may act as a target site protection agent for host device B 160 and may fail I/O requests sent from host 116 to LU B 156 through host device B 160. In some embodiments, in a recovery mode, target DPA 124 may undo the write transactions in journal LU 176 so as to restore the target storage system 120 to an earlier state.

Referring to FIG. 2, in some described embodiments, a write transaction 200 may be included within a journal and stored within a journal LU. In some embodiments, write transaction 200 may include one or more identifiers; a time stamp indicating the date and time at which the transaction was received by the source DPA; a write size indicating the size of the data block; a location in the journal LU where the data is entered; a location in the target LU where the data is to be written; and the data itself.

Referring to both FIGS. 1 and 2, in some embodiments, transaction 200 may correspond to a transaction transmitted from source DPA 112 to target DPA 124. In some embodiments, target DPA 124 may record write transaction 200 in the journal that includes four streams. In some embodiments, a first stream, referred to as a "DO" stream, includes a copy of the new data for writing to LU B 156. In some embodiments, a second stream, referred to as a "DO META-DATA" stream, includes metadata for the write transaction, such as an identifier, a date and time, a write size, the offset within LU B 156 where the new data is written, and a pointer to the offset in the DO stream where the corresponding data is located. In some embodiments, a third stream, referred to as an "UNDO" stream, includes a copy of the data being overwritten within LU B 156 (referred to herein as the "old" data). In some embodiments, a fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal may contain the "undo" information necessary to rollback storage system 120, in some embodiments, data that was stored in specific memory locations at a specified point in time may be obtained by undoing write transactions that occurred subsequent to such point in time (PIT).

In some embodiments, each of the four streams may hold a plurality of write transaction data. In some embodiments, as write transactions are received dynamically by the target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. In some embodiments, validating data replicas can be important, for example, in data replication systems employing incremental backup where an undetected error in an earlier data replica may lead to corruption of future data replicas.

In conventional systems, validating data replicas can increase the journal lag, which may increase a recovery time objective (RTO) of a data protection system (e.g., an elapsed time between replicas or PITs). In such conventional systems, if the journal lag time is significant, the journal may become full and unable to account for data changes due to subsequent transactions. Further, in such conventional systems, validating data replicas may consume system resources (e.g., processor time, memory, communication link bandwidth, etc.), resulting in reduced performance for system tasks.

Figure 3:
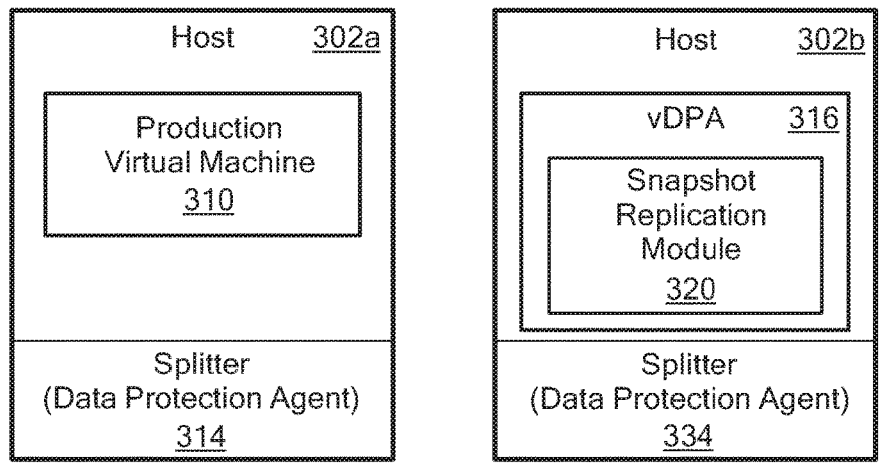
FIG. 3 is a block diagram of an example of a data protection system to perform snapshot replication on a storage system not configured to support snapshot replication, according to an illustrative embodiment of the instant disclosure.
Figure 3:
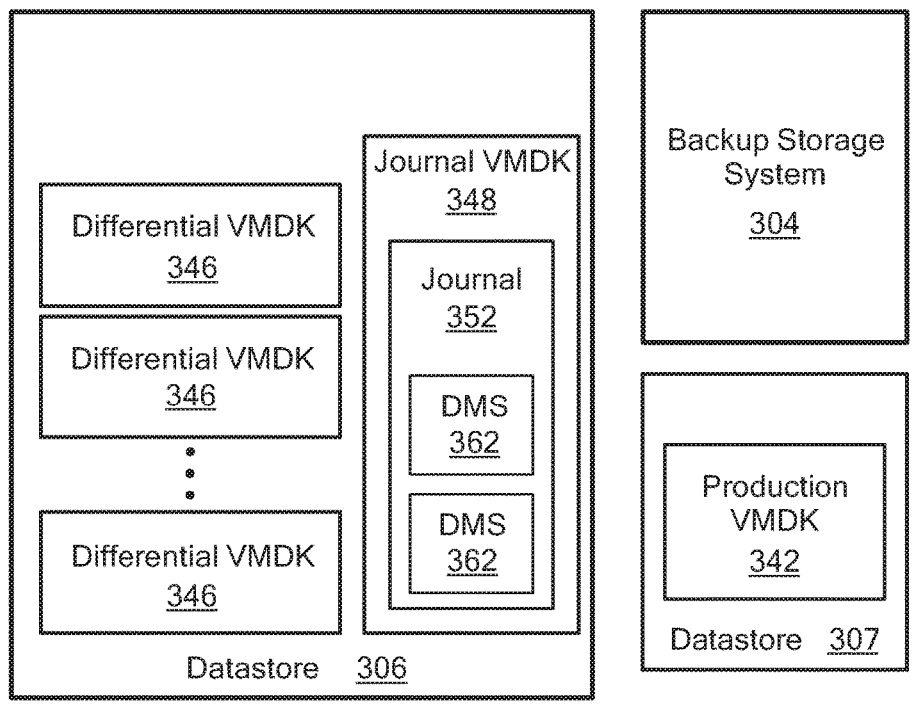

Referring to FIG. 3, in an illustrative embodiment, a data protection system 300 may include host 302*a*, host 302*b*, backup storage system 304 (e.g., a deduplicated storage system) and a datastore 306. In some embodiments, host 302*a* may include production virtual machine 310 and splitter 314 (e.g., data protection agent 144 of FIG. 1). In some embodiments, host 302*b* may be a hypervisor and splitter 314 may operate either in the hypervisor kernel or in another layer in the hypervisor, which allows splitter 314 to intercept I/O requests sent from host 302*a* to one or more virtual machine disks (VMDKs) 342. In some embodiments, host 302*b* may include a virtual data protection appliance (e.g., DPA appliance 124 of FIG. 1) having snapshot replication module 320 and splitter 334 (e.g., data protection agent 164 of FIG. 1). In an embodiment, splitter 334 of host 302*b* enables protection of virtual machines on the host 302*b*. In some embodiments, splitter 334 of host 302*b* may also provide faster access to VMDKs 342 from virtual DPA (vDPA) 316.

In an embodiment, datastore 306 may include one or more differential virtual machine disks, shown as differential VMDKs 346. Some embodiments of datastore 306 may also include journal virtual machine disk 348. In some embodiments, differential VMDKs 346 and journal VMDK 348 may be stored in datastore 306, and one or more production virtual machine disks 342 may be stored in datastore 307. In some embodiments, datastore 306 and datastore 307 are separate physical devices so that access to differential VMDKs does not affect performance of production VMDKs. In some embodiments, the differential VMDKs 346 may be used to store differential snapshot data representative of changes that happened to data stored on production VMDK 342. In one example, a first differential VMDK 346 may include changes due to writes that occurred to production VMDK 342 from time t1 to time t2, a second differential VMDK 346 may include the changes due to writes that occurred to production VMDK 342 from time t2 to time t3, and so forth.

In some embodiments, differential VMDKs 346 may be thin provisioned. Thin provisioning allocates storage space to volumes of a SAN in a flexible manner among multiple volumes based on a minimum space requirement for each volume at any given time.

In some embodiments, data protection system may include one or more consistency groups. In some embodiments, a consistency group may treat source volumes (e.g., production volumes) and target volumes (e.g., backup volumes) as a single logical entity for data replication and migration.

In some embodiments, journal 352 may be stored in journal VMDK 348. In some embodiments, journal 352 includes one or more delta marker streams (DMS) 362. In some embodiments, each DMS 362 may include metadata associated with data that may be different between one differential VMDK and another differential VMDK.

In one example, DMS 362 may include the metadata differences between a current copy of the production VMDK 342 and a copy currently stored in backup storage 304. In some embodiments, journal 352 does not include the actual data changes, but rather metadata associated with the changes. In some embodiments, the data of the changes may be stored in the differential VMDKs. Thus, some embodiments may operate employing thin volumes to perform data replication by tracking regions for replications with the thin devices, as described herein. Other embodiments may operate to replicate data directly (e.g., without employing thin devices) from a source storage to a target (or replica) storage.

Although not shown in FIG. 3, in some embodiments, host 302b, datastore 306 and backup storage system 304 may be integrated into a single device, such as an integrated protection appliance to backup and protect production data.

Figure 4:
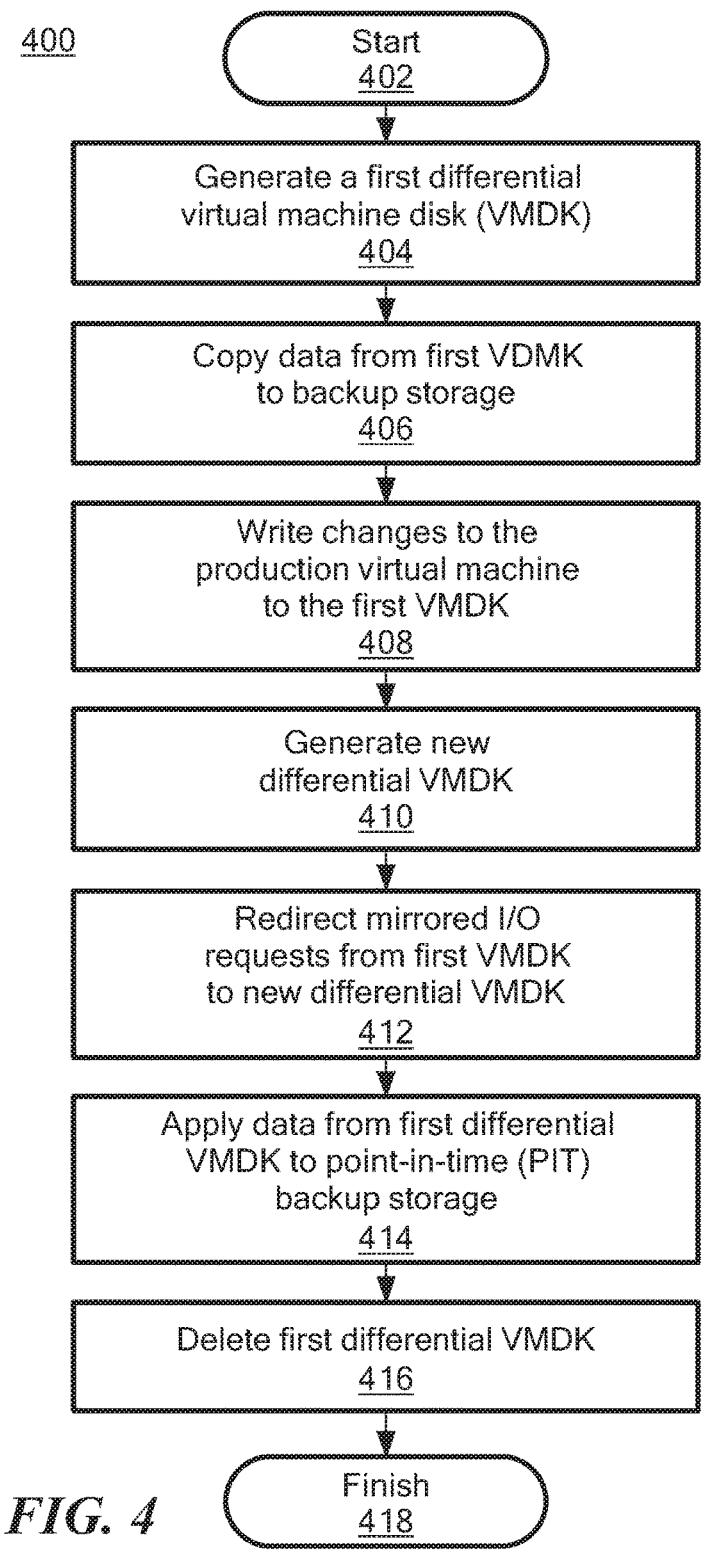
FIG. 4 is a flowchart of an example of a process to generate an initial snapshot into backup storage, according to an illustrative embodiment of the instant disclosure.

Referring to FIG. 4, some described embodiments may employ illustrative process 400 to generate an initial snapshot into the backup storage. Process 400 starts at block 402. In some embodiments, at block 404, a VMDK is generated. For example, vDPA 316 of FIG. 3 may generate a first VMDK 346 that will include changes and a delta marker stream (DMS) 362 on journal 352. In an embodiment, VMDK 346 is thin provisioned. In some embodiments, at block 406, data is copied (e.g., by vDPA 316 of FIG. 3) from a first virtual machine (e.g., production virtual machine 310 of FIG. 3) to a backup storage (e.g., backup storage system 304 of FIG. 3). In other words, in some embodiments, data is read from a production volume and written to backup storage by vDPA 316.

In some embodiments, at block 408, changes to the production virtual machine may be written to the differential VMDK. For example, vDPA 316 may write changes to production data of production virtual machine 310 to first differential VMDK 346. In some embodiments, splitter 314 may intercept write I/O requests arriving to production VMDK 342, and send them to vDPA 316, which may mark the metadata of changed locations (e.g., an offset and volume of the writes) in DMS 362, and acknowledge the I/O requests. In some embodiments, splitter 314 may write data associated with the I/O request to production VMDK 342 and, asynchronously, vDPA 316 may write data arriving from splitter 314 to differential VMDK 346.

In some embodiments, data stored on production volume 342 can change while data is being copied from it to backup storage (e.g., differential VMDK 346), for example if an I/O request is received while data is being copied. Thus, a snapshot replica may not be consistent with the data stored on the production volume. In some embodiments, at block 410, when a non-consistent copy for production VMDK 342 is generated on backup storage 304, process 400 may generate a new differential VMDK 346, which may also be a thin provisioned VMDK. In some embodiments, at block 412, mirrored I/O requests may be redirected from the production virtual machine to the new differential VMDK. For example, in some embodiments, splitter 334 may send I/O requests to vDPA 316a, and vDPA 316 may then asynchronously write data associated with the I/O requests to the new differential VMDK 346 and write metadata for the I/O request to the associated DMS 362.

In some embodiments, at block 414, data from the first differential VMDK 346 may be applied to a point-in-time in backup storage. For example, in some embodiments, vDPA 316 may apply data from the first differential VMDK 346 to a point-in-time replica in backup storage 304 (e.g., vDPA 316 reads the list of changed locations from a first DMS 362 and, for each changed location, vDPA 316 reads the changes from the associated differential VDMK 346 and writes the changes to backup storage system 304).

In some embodiments, at block 416, the first differential VMDK may be deleted. For example, in some embodiments, after backup storage 304 has a consistent point-in-time replica (e.g., as stored at block 414), vDPA 316 may delete the first differential VMDK. Process 400 completes at block 418.

Figure 5:
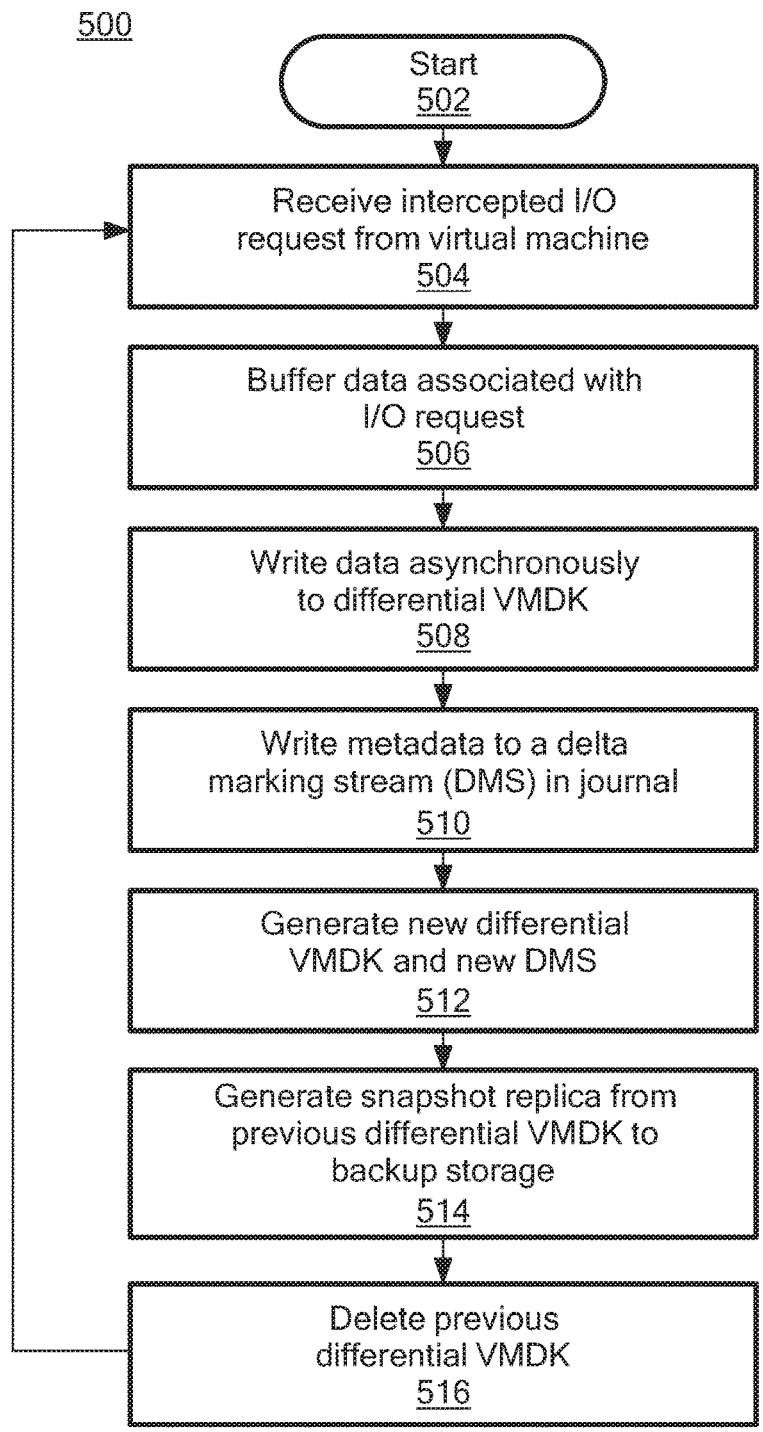
FIG. 5 is a flowchart of an example of a process to perform snapshot replication on a storage system not configured to support snapshot replication, according to an illustrative embodiment of the instant disclosure.

Referring to FIG. 5, process 500 is an example of a process to perform snapshot replication on a storage system not configured to support snapshot replication, according to described embodiments. In some embodiments, process 500 may be performed by snapshot replication module 320. In some embodiments, at block 504, I/O requests from the virtual machine may be intercepted. For example, in some embodiments, I/O requests may be intercepted by splitter 314 and sent to vDPA 316. In some embodiments, at block 506, data associated with the I/O request may be buffered. For example, in some embodiments, vDPA 316 may buffer the data associated with the I/O request in memory of vDPA 316 and may send an acknowledgement that it received the I/O request to splitter 314. In some embodiments, splitter 314 may then write the data associated with the I/O request to production VMDK 342.

In some embodiments, at block 508, data associated with the I/O request may be written asynchronously to the differential VMDK, and, at block 510, metadata may be written to a delta marking stream (DMS) in an associated journal. For example, in some embodiments, vDPA 316 may write the data associated with the I/O request asynchronously to differential VMDK 346 and write the metadata associated with the I/O request to DMS 362. In some embodiments, journal metadata may also be stored at a predetermined portion of the associated VMDK (e.g., at the end of the VMDK).

In some embodiments, at block 512, a new differential VMDK and a new DMS may be generated. At block 514, system 300 may generate a snapshot replica corresponding to a point-in-time (PIT) to be stored in the backup storage. For example, in some embodiments, new differential VMDK 346 and new DMS 362 may be generated by vDPA 316 to track further changes (e.g., changes after the PIT). In some embodiments, system 300 may generate a point-in-time snapshot replica by having vDPA 316 generate a snapshot replica of the PIT copy in backup storage 304. In some embodiments, data differences from differential VDMK 346 may be applied to the new snapshot replica, so that backup storage 304 holds both a snapshot replica at the old PIT and a snapshot replica at the new PIT.

In some embodiments, at block 516, a previous differential VMDK may be deleted. For example, vDPA 316 may delete an earlier one of the differential virtual machine disks 346. In some embodiments, after block 516, process 500 may repeat by returning to block 504 to receive subsequent intercepted I/O requests.

To generate a full sweep disk synchronization (e.g., a full copy of the production volume) may be complicated since the thin volumes contain data changes, but not the complete data, and copying the entire production volume can be time consuming and consume system resources (e.g., if the production volume is large). Thus, some embodiments may perform a number of iterations of production volume synchronization to reduce an amount of time to perform the full sweep disk synchronization.

In some described embodiments, at the start of a copy process, a complete copy of the entire production volume may be created. However, for a large production volume, creating a complete copy could be time consuming. Further, during the time required to copy the entire production volume, additional I/O requests could be received, leading to changes of data on the production volume that are tracked in the VMDKs. In conventional systems, the VMDKs then need to be large to account for changes that occur during the production volume copying time, or risk becoming full and not being able to process additional I/O requests. Some described embodiments reduce the need to maintain large VMDKs without risking becoming full due to I/O requests received while copying the production volume.

Figure 6:
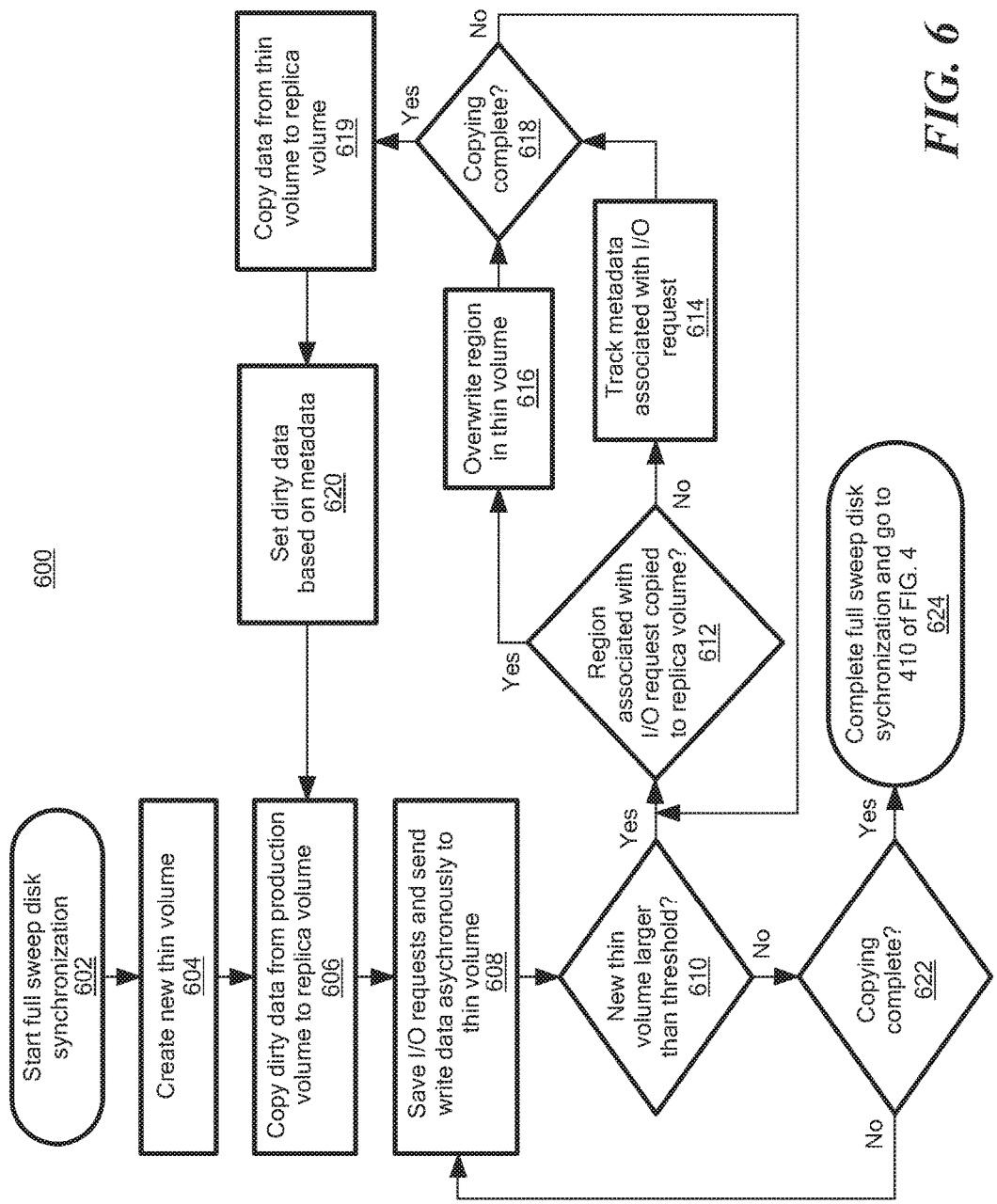
FIG. 6 is a flowchart of an example of a process to perform full sweep disk synchronization, according to an illustrative embodiment of the instant disclosure.

Referring to FIG. 6, some described embodiments may employ illustrative process 600 to perform full sweep disk synchronization. At block 602, process 600 begins. In some embodiments, at block 604, a new thin volume is created (e.g., production VMDK 342). In some embodiments, at block 606, "dirty" data is copied from the production volume to a replica volume. In some embodiments, dirty data is data that has changed on the production volume (e.g., due to an I/O request) since the most recent replica was created. In some embodiments, the first time process 600 is performed (e.g., the first time a replica of the production volume is generated), all the data of the production volume may be considered dirty, since no data has yet been copied to a replica. In some embodiments, the copying of block 606 may continue to be performed (e.g., to copy a large amount of data) while process 600 continues to block 608 (and subsequent blocks). In other words, block 606 may be performed in parallel with one or more of blocks 608-622 of process 600.

In some embodiments, at block 608, I/O requests, for example, write requests, received by the DPA are saved and sent, asynchronously to the thin volume as dirty data. In some embodiments, at block 610, if the thin volume created at block 604 reaches or exceeds a threshold size, then at block 612, data protection system 100 enters a second mode of operation. In some embodiments, at block 612, if a region of the production volume associated with a given I/O request (e.g., one of the I/O requests saved at block 608) has already been copied to the thin volume, then at block 616, data in the thin volume is overwritten with data associated with the I/O request, which does not require additional space for the thin volume (e.g., does not track additional metadata). Process 600 continues to block 618.

In some embodiments, if, at block 612, the region of the production volume associated with a given I/O request (e.g., one of the I/O requests saved at block 608) has not yet been copied to the thin volume, then at block 614, metadata of data changes due to the I/O request is tracked in a DMS associated with the thin volume. As shown in FIG. 6, process 600 may continue to block 618.

In some embodiments, at block 618, if copying the production volume to the replica volume (e.g., block 606) has been completed, then at block 619, data from the thin volume may be copied to the replica volume. In some embodiments, while block 619 is occurring, any received I/O requests are tracked in the associated DMS (even if the I/O request is associated with a location already copied to the thin volume). In some embodiments, at block 620, the DPA sets dirty data indicators based upon metadata stored in the associated DMS (e.g., for received I/O requests), and process 600 returns to block 606 to copy the dirty data from the production volume to the replica volume. In some embodiments, if, at block 618, copying the production volume to the replica volume (e.g., block 606) has not yet been completed, then process 600 returns to block 612 to process a subsequent I/O request.

In some embodiments, at block 610, if the thin volume created at block 604 did not reach or exceed a threshold size, then at block 622, data protection system 100 stays in the first mode of operation (e.g., block 608) if copying the production volume to the replica volume (e.g., block 606) has not yet been completed. In some embodiments, if, at block 622, copying the production volume to the replica volume (e.g., block 606) has been completed, then at block 24, the full sweep disk synchronization is complete, and data protection system 100 operates, for example, as shown at block 410 of FIG. 4.

Referring back to FIGS. 1 and 3, as described herein, in some embodiments, protection agent 144 may intercept I/O requests for storage 108 and send the I/O request to DPA 112, such as described in regard to FIG. 1. In some embodiments, DPA 112 may be implemented as vDPA 316 of FIG. 3. In some embodiments, a thin volume is attached to vDPA 316, for example production VMDK 342. In some embodiments, the I/O request is provided by vDPA 316 to VMDK 342. In some embodiments, vDPA 316 tracks changes to data stored in VMDK 342 as metadata in DMS 362. In some embodiments, when the I/O request is processed, vDPA 316 may acknowledge the I/O request to protection agent 144.

Some described embodiments may generate a snapshot replica by creating a new thin volume (e.g., another VMDK), and attaching the new VMDK to vDPA 316. In some embodiments, vDPA 316 may maintain a list of all changed (dirty) addresses of each VMDK. In some embodiments, when the data protection system first begins operation (or after a snapshot has been generated), there may be no dirty data until I/O requests (e.g., writes) are received. In some embodiments, as I/O requests are received, the DO METADATA of FIG. 2 may be employed to track dirty data (e.g., data that was changed by an I/O request). In some embodiments, when the I/O request is intercepted by the protection agent, the I/O request is sent to the vDPA, which writes the I/O request to the first (e.g., production) VMDK, and tracks metadata associated with the I/O request in the UNDO METADATA of FIG. 2.

In some embodiments, in response to a snapshot request (e.g., at an interval determined by a desired RTO), I/O requests are written from vDPA 316 to the new VMDK. Some embodiments may then copy data from the first (e.g., production) VMDK to the new (e.g., replica) VMDK as a background process based on data marked as changed (e.g., "dirty") in DMA 362.

In some embodiments, if the size of the production VMDK becomes bigger than a threshold while data is copied from the production VMDK to the replica VMDK, a third VMDK may be created having a third DMS to track dirty data. In some embodiments, if a new I/O request arrives, the vDPA may determine if the address associated with the new I/O request is already written to the replica VMDK. In some embodiments, if the address is already copied from the production VMDK to the replica VMDK, then the data of the I/O request is written to the replica VMDK. Otherwise, in some embodiments, if the address has not yet been copied from the production VMDK to the replica VMDK, then the dirty data metadata is updated in the third DMS.

In some embodiments, when the data is entirely copied from the production VMDK to the replica VMDK (e.g., the background process is completed), the production VMDK is deleted, and the third VMDK is renamed to operate in the place of the production VMDK. In other words, is some embodiments, the DMS associated with the production VMDK and the DMS associated with the replica VMDK are deleted, and the DMS associated with the third VMDK is renamed to operate as the production DMS.

In some embodiments, if the size of the production VMDK remains smaller than a threshold while data is copied from the production VMDK to the replica VMDK, and if a new I/O request arrives, the data of the I/O request is written to the replica VMDK. In some embodiments, once the data is entirely copied from the production VMDK to the replica VMDK (e.g., the background process is completed), the production VMDK is deleted, and the replica VMDK is renamed to operate as the production VMDK.

Figure 7:
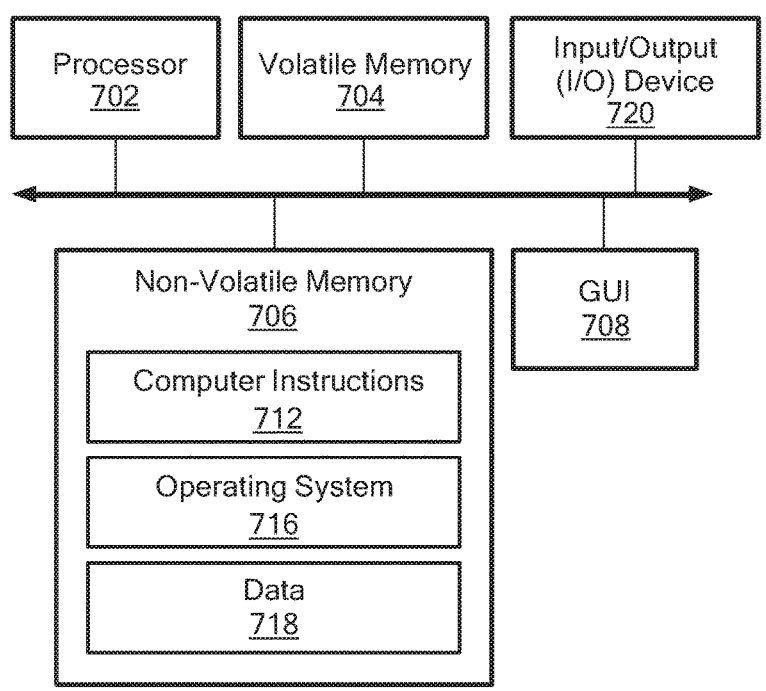
FIG. 7 is a block diagram of an example of a hardware device that may perform at least a portion of the processes in FIGS. 4-6.

In some described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 7. As shown in FIG. 7, computer 700 may include processor 702, volatile memory 704 (e.g., RAM), non-volatile memory 706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704 to perform at least a portion of the processes shown in FIGS. 4-6. Program code may be applied to data entered using an input device of GUI 708 or received from I/O device 720.

Processes 400, 500 and 600 (FIGS. 4-6) are not limited to use with the hardware and software of FIG. 7 and may find applicability in any computing or processing environment and with any type of machine or set of machines that may be capable of running a computer program. Processes 3400, 500 and 600 (FIGS. 4-6) may be implemented in hardware, software, or a combination of the two.

The processes described herein are not limited to the specific embodiments described. For example, processes 400, 500 and 600 are not limited to the specific processing order shown in FIGS. 4-6. Rather, any of the blocks of processes 400, 500 and 600 may be re-ordered, combined or removed, performed in parallel or in serial, as necessary, to achieve the results set forth herein.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
   creating a first thin volume associated with a production volume;
   generating a first replica of the production volume by copying data from the production volume to a replica volume;
   during the copying:
      receiving an I/O request to be written to the production volume;
      writing data from the I/O request to the first thin volume and tracking data changed due to the I/O request in metadata associated with the production volume and the first thin volume;
      checking data size of the first thin volume;
      when the size of the first thin volume is below a threshold, asynchronously applying changes from the first thin volume to a backup storage;
      when the size of the first thin volume is at or above a threshold;
      determining whether a region of the production volume associated with the received I/O request has already been copied from the production volume to the first thin volume; and
      when the region is already copied, overwriting an associated region in the first thin volume, whereby an amount of metadata to track changed data is reduced.

2. The method of claim 1, further comprising performing the copying as a background process while processing new received I/O requests.

3. The method of claim 1, further comprising, when the size of the first thin volume is below the threshold and the region is already copied from the production volume to the replica volume:
   when the copying data from the production volume to the replica volume is complete, generating a second thin volume and writing data for new received I/O requests to the second thin volume.

4. The method of claim 3, further comprising, when the size of the first thin volume is at or above the threshold and the region is already copied from the production volume to the replica volume:
   copying data from the first thin volume to the replica volume;
   during the copying from the first thin volume to the replica volume, tracking data changed due to a new I/O request in metadata associated with the first thin volume; and
   when the copying from the first thin volume to the replica volume is complete, setting, based upon the metadata, locations as dirty data to be copied from the production volume to the replica volume.

5. The method of claim 3, wherein upon determining the data size of the first thin volume meets or exceeds the threshold while data is being copied from the production volume to the replica volume:
   creating a third thin volume having corresponding metadata;
   upon receiving a next I/O request, determining if an address associated with the next I/O request is already written to the replica volume;
   if the address is already copied to the replica volume, writing the data of the I/O request to the replica volume; and
   if the address has not been copied from the production volume to the replica volume, updating the corresponding metadata.

6. The method of claim 1, further comprising, when the region of the production volume associated with the received I/O request has not yet been copied from the production volume to the replica volume, tracking data changed due to the I/O request in metadata associated with the first thin volume.

7. A system comprising:
   a processor; and
   memory storing computer program code that when executed on the processor causes the processor to operate a storage system, the storage system operable to perform the operations of:
      creating a first thin volume associated with a production volume;
      generating a first replica of the production volume by copying data from the production volume to a replica volume;
      during the copying:
         receiving an I/O request to be written to the production volume;
         writing data from the I/O request to the first thin volume and tracking data changed due to the I/O request in metadata associated with the production volume and the first thin volume;
         checking data size of the first thin volume;
         when the size of the first thin volume is below a threshold, asynchronously applying changes from the first thin volume to a backup storage;
         when the size of the first thin volume is at or above a threshold, the storage system is operable to perform the operations of:
            determining whether a region of the production volume associated with the received I/O request has already been copied from the production volume to the first thin volume; and
            when the region is already copied, overwriting an associated region in the first thin volume, whereby an amount of metadata to track changed data is reduced.

8. The system of claim 7, wherein the storage system is operable to perform the operation of performing the copying as a background process while processing new received I/O requests.

9. The system of claim 7, wherein, when the size of the first thin volume is below the threshold and when the region is already copied from the production volume to the replica volume, the storage system is operable to perform the operation of:
  when the copying data from the production volume to the replica volume is complete, generating a second thin volume and writing data for new received I/O requests to the second thin volume.

10. The system of claim 9, wherein, when the size of the first thin volume is at or above the threshold and the region is already copied from the production volume to the replica volume, the storage system is operable to perform the operations of:
  copying data from the first thin volume to the replica volume;
  during the copying from the first thin volume to the replica volume, tracking data changed due to a new I/O request in metadata associated with the first thin volume; and
  when the copying from the first thin volume to the replica volume is complete, setting, based upon the metadata, locations as dirty data to be copied from the production volume to the replica volume.

11. The system of claim 7, wherein, when the region of the production volume associated with the received I/O request has not yet been copied from the production volume to the replica volume, the storage system is operable to perform the operation of tracking data changed due to the I/O request in metadata associated with the first thin volume.

12. A computer program product including a non-transitory computer readable storage medium having computer program code encoded thereon that when executed on a processor of a computer causes the computer to operate a storage system, the computer program product comprising:
  computer program code for creating a first thin volume associated with a production volume;
  computer program code for generating a first replica of the production volume by copying data from the production volume to a replica volume, wherein the copying is performed as a background process while processing new received I/O requests;
  during the copying:
    computer program code for receiving an I/O request to be written to the production volume;
    computer program code for writing data from the I/O request to the first thin volume and tracking data changed due to the I/O request in metadata associated with the production volume and the first thin volume;
    computer program code for checking data size of the first thin volume, and, when the size of the first thin volume is below a threshold, asynchronously applying changes from the first thin volume to a backup storage;
    when the size of the first thin volume is at or above a threshold:
    determining whether a region of the production volume associated with the received I/O request has already been copied from the production volume to the first thin volume; and
    when the region is already copied, overwriting an associated region in the first thin volume, whereby an amount of metadata to track changed data is reduced.

13. The computer program product of claim 12, further comprising, computer program code for performing the copying as a background process while processing new received I/O requests.

14. The computer program product of claim 12, further comprising, when the size of the first thin volume is below the threshold and the region is already copied from the production volume to the replica volume:
  when the copying data from the production volume to the replica volume is complete, computer program code for generating a second thin volume and writing data for new received I/O requests to the second thin volume.

15. The computer program product of claim 14, further comprising, when the size of the first thin volume is at or above the threshold and the region is already copied from the production volume to the replica volume:
  computer program code for copying data from the first thin volume to the replica volume;
  during the copying from the first thin volume to the replica volume, computer program code for tracking data changed due to a new I/O request in metadata associated with the first thin volume; and
  when the copying from the first thin volume to the replica volume is complete, computer program code for setting, based upon the metadata, locations as dirty data to be copied from the production volume to the replica volume.

16. The computer program product of claim 12, further comprising, when the region of the production volume associated with the received I/O request has not yet been copied from the production volume to the replica volume, computer program code for tracking data changed due to the I/O request in metadata associated with the first thin volume.

* * * * *